Dec. 10, 1963 W. MELLO 3,113,525
MODIFIED PUMP FOR VISCOUS MATERIAL
Filed June 6, 1962 3 Sheets-Sheet 3
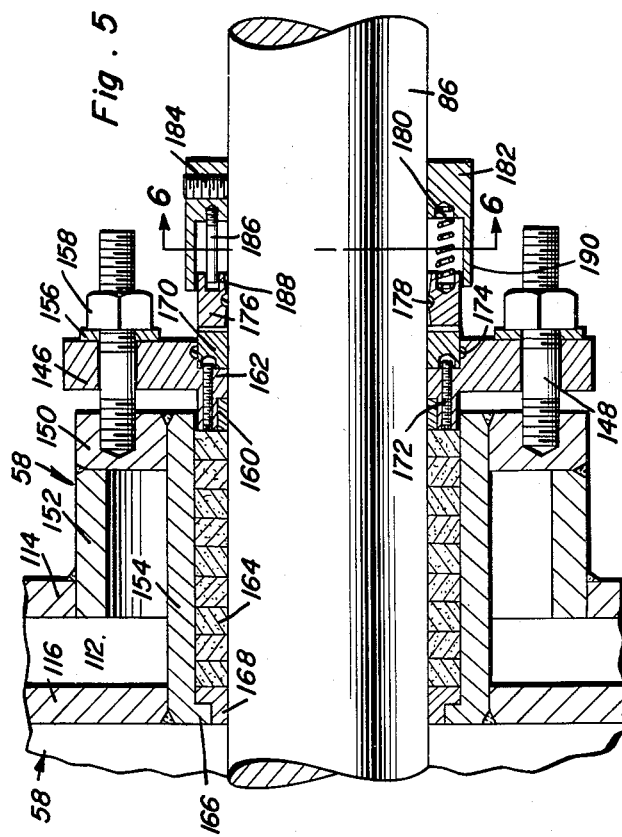
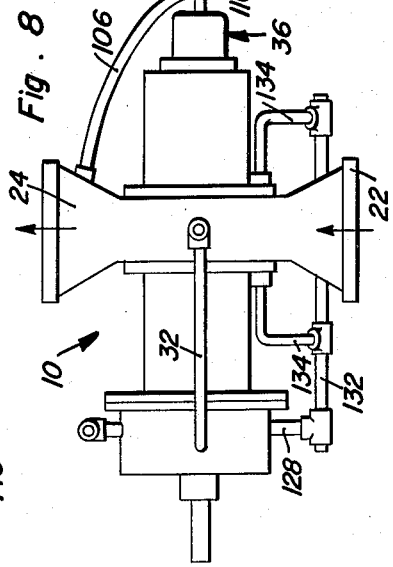
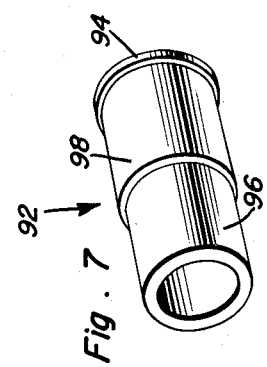
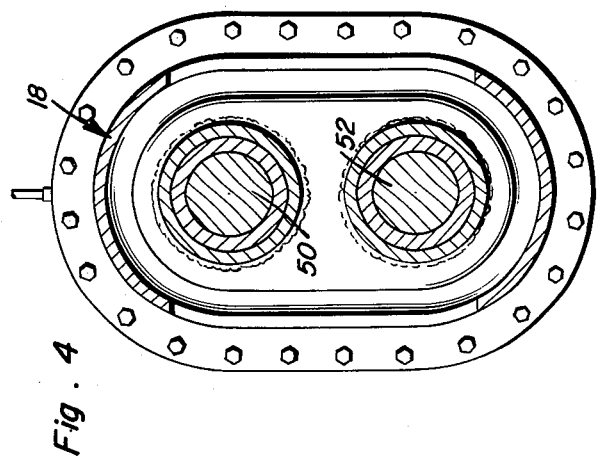
William Mello
INVENTOR.

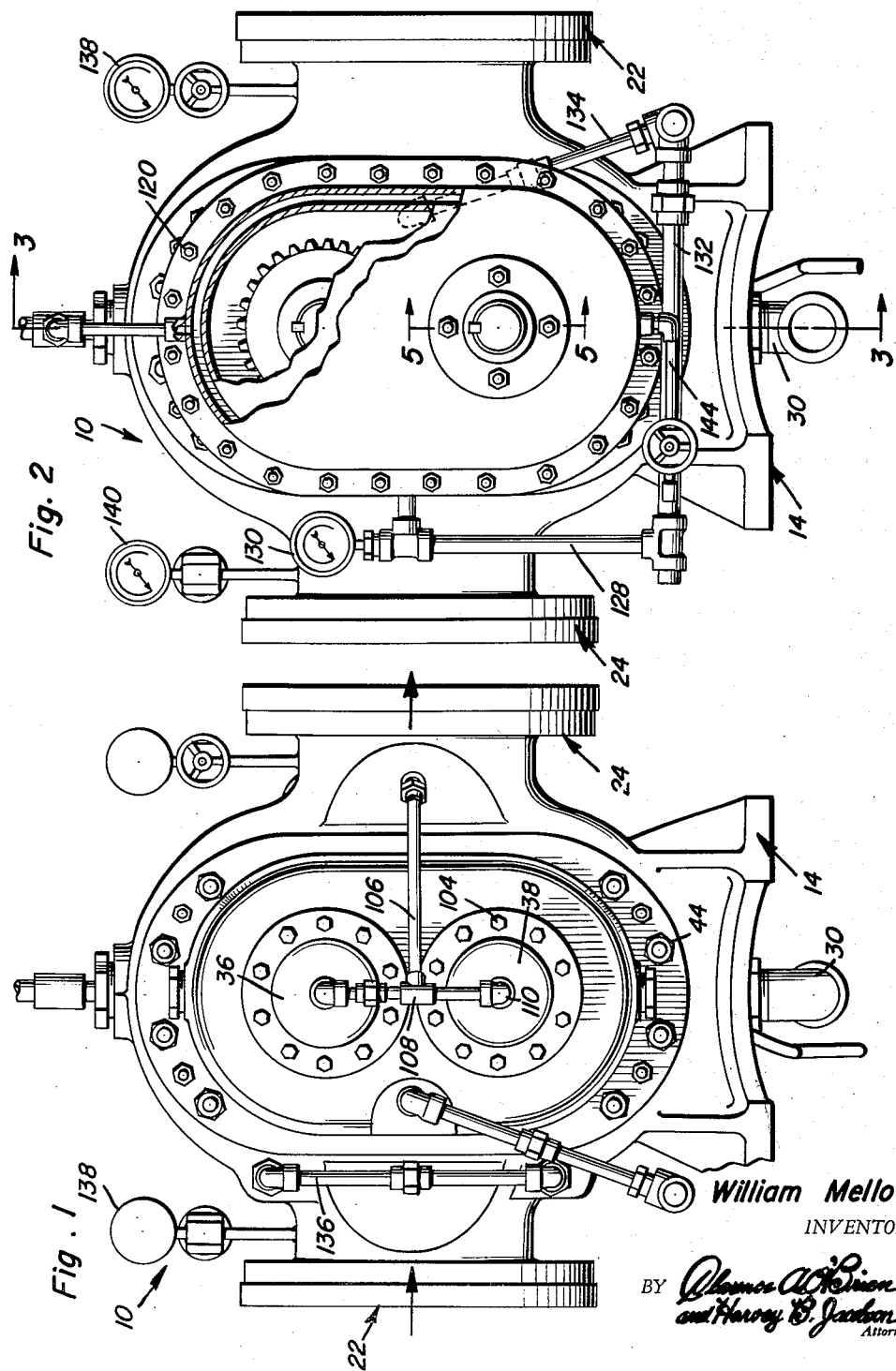

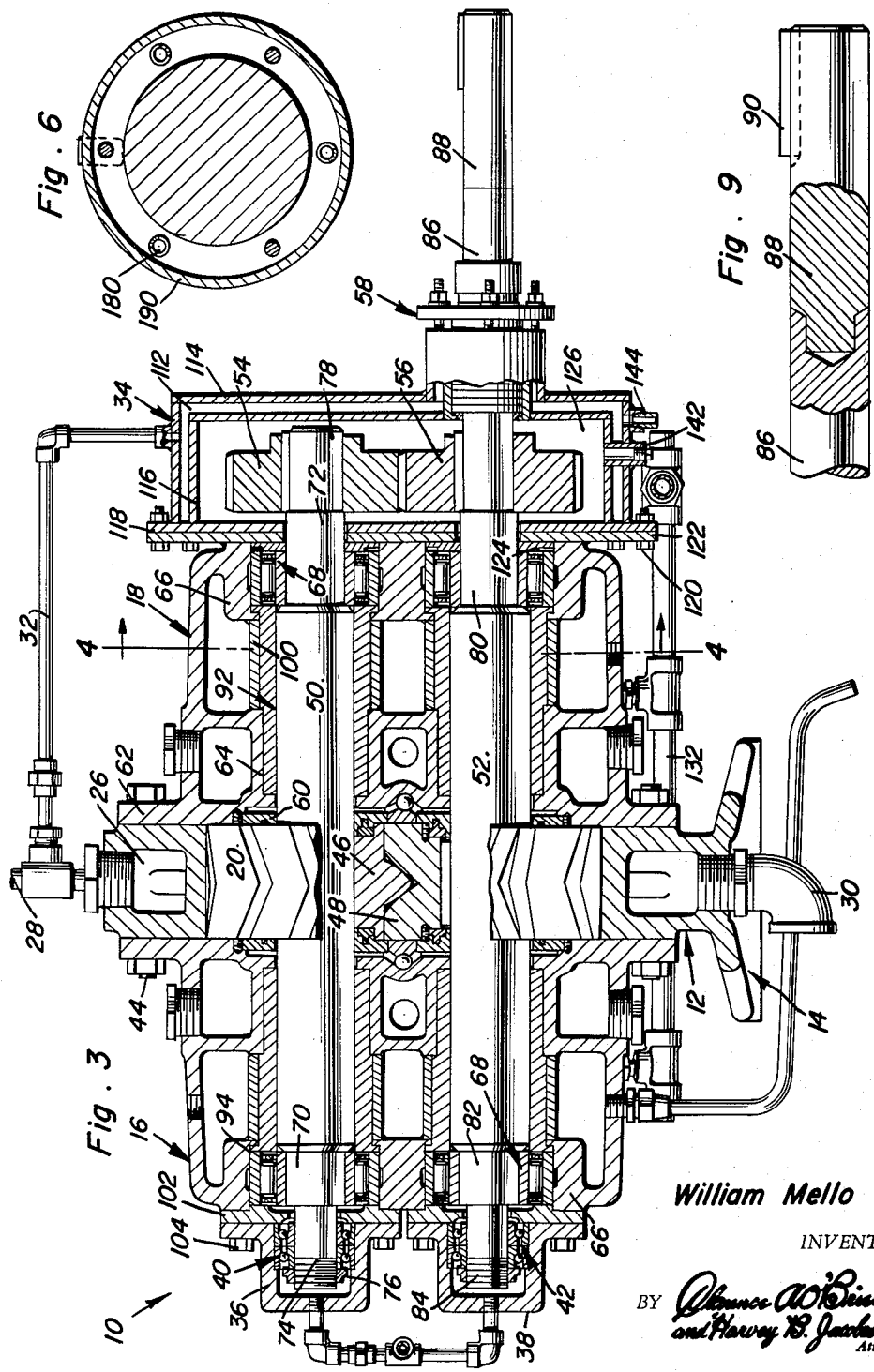

United States Patent Office 3,113,525
Patented Dec. 10, 1963

3,113,525
MODIFIED PUMP FOR VISCOUS MATERIAL
William Mello, 93 Washington Ave., Revere, Mass.
Filed June 6, 1962, Ser. No. 200,507
7 Claims. (Cl. 103—126)

This invention relates to a positive displacement type of pump assembly reconditioned for pumping of viscous type material such as oxidized asphalt.

Positive displacement gear pumps heretofore utilized were considered unsuitable in connection with the flow of viscous type material such as oxidized asphalt therethrough from both an operational standpoint and a safety standpoint. It is therefore a primary object of the present invention to provide a positive displacement type gear pump in which leakage is eliminated and operation of the pump assembly for an indefinite period of time insured.

Positive displacement types of gear pumps as heretofore constructed, were designed to eliminate leakage of fluid from the pump rotor chamber by provision of stuffing boxes on opposite axial sides of the rotor chamber, the rotor shafts being journaled in axially spaced relation from the stuffing boxes by frame mounted bearing assemblies and within the gear drive casing, the bearing assemblies and gear casing having lubricating systems independent of the pump assembly from a pressure standpoint. Accordingly, the leakage sealing problem in connection with the bearing assemblies, and the pump rotor chamber were dealt with separately and satisfactorily in connection with the usual type of fluid for which the positive displacement pumps were designed. In connection with the pumping of viscous material, however, the flow of leakage fluid into the stuffing boxes eventually caused serious operational problems due to congealing of the material as well as to cause an increased lubrication problem for bearing assemblies and the gears in view of the greater torques required for pumping of the viscous material and the resulting higher lubricating pressures generated. Accordingly, a modified positive displacement pump has been provided wherein stuffing box leakage is eliminated while at the same time the bearing lubricating pressures are so arranged as to prevent any congealing of the viscous material that may flow along the rotor shafts as leakage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the modified pump assembly;

FIGURE 2 is a side elevational view of the pump assembly viewed from the side opposite that of FIGURE 1 with parts broken away and shown in section;

FIGURE 3 is a longitudinal sectional view taken substantially through a plane indicated by section line 3—3 in FIGURE 2;

FIGURE 4 is a sectional view taken substantially through a plane indicated by section line 4—4 in FIGURE 3;

FIGURE 5 is an enlarged partial sectional view taken substantially through a plane indicated by section line 5—5 in FIGURE 2;

FIGURE 6 is a transverse sectional view taken substantially through a plane indicated by section line 6—6 in FIGURE 5;

FIGURE 7 is a perspective view of the packing replacing bushing;

FIGURE 8 is a diagrammatic view illustrating the fluid connections between the various components of the pump assembly; and FIGURE 9 is an enlarged partial breakaway view of a portion of the extended drive shaft of the pump assembly.

Referring now to the drawings in detail, the pump assembly of the present invention is generally referred to by reference numeral 10 and as more clearly seen in FIGURES 1, 2 and 3, includes a pump housing generally referred to by reference numeral 12 having a base portion 14 connected thereto for support of the assembly. The pump housing 12 is enclosed on opposite axial sides thereof by means of pump frame sections 16 and 18 to define therebetween a pump rotor chamber 20. The pump housing 12 forms the annular outer wall for the rotor chamber 20 between a suction inlet portion 22 and a discharge outlet portion 24 as more clearly seen in FIGURES 1 and 2. An annular heating chamber 26 is enclosed within the pump housing 12 receiving a flow of steam from steam inlet 28 and exhausted through the steam outlet 30 which projects downwardly from the pump assembly base portion 14. Thus, the flowing steam being in heat transfer relation to the rotor chamber 20 will maintain the viscous material flowing therethrough in a fluent state. The steam inlet line 28 is also connected by a steam inlet conduit 32 to a steam jacketed gear casing generally referred to by reference numeral 34 which is secured to the pump frame section 18 in spaced relation to the pump housing 12. Also connected to the pump frame section 16 at one axial side of the pump assembly opposite from the gear housing 34, are a pair of pressurized lubricating housings 36 and 38 for lubricating end thrust bearing assemblies 40 and 42, respectively with lubricant which may be the material being pumped. The pump frame sections 16 and 18 are therefore secured in assembled relation on opposite sides of the pump housing 12 by means of a plurality of bolt assemblies 44 so that the rotor chamber 20 may rotatably mount in sealed relation, a pair of intermeshing displacement gear rotor members 46 and 48, respectively connected to the auxiliary rotor shaft 50 and the main rotor shaft 52. One axial end of each of the rotor shafts 50 and 52 mount the end thrust bearing assemblies 40 and 42 within the lubricating housing 36 and 38 while the opposite ends of the rotor shafts have respectively connected thereto intermeshing drive gears 54 and 56 located within the gear casing assembly 34. The main rotor shaft 52 projects out of the gear casing assembly 34 through a high pressure seal assembly generally referred to by reference numeral 58 for connection to some prime mover.

The pump rotor chamber 20 is provided with the usual sealing plate members 60 disposed about each of the rotor shafts on opposite sides of the material displacing gear members 46 and 48 so as to confine the flow of material between the inlet and outlet. Each of the sealing plate members 60 is therefore connected to the bearing head plate portion 62 bolted to each side of the pump housing 12 by the bolt assemblies 44, the head plate portions being provided with axially extending tubular stuffing box extensions 64 disposed in encircling relation about each of the rotor shafts 50 and 52 on the opposite axial sides of the rotor chamber. Axially spaced from each of the tubular extensions 64 are the bearing support portions 66 to which the outer races of spaced bearing assemblies 68 are connected to journal each of the rotor shafts 50 and 52. Thus, the auxiliary rotor shaft 50 includes neck down portions 70 and 72 on which portions the inner races of the bearing assemblies 68 are secured. Connected to the portion 70 of the auxiliary rotor shaft 50, is a projecting end portion 74 externally threaded for receiving the lock nut 76 disposed in abutting relation against the end thrust bearing assembly 40. The other axial end of the auxiliary shaft 50 is provided with a portion 78 which is keyed to the drive gear 54. The main rotor shaft 52 similarly includes neck down portions 80 and 82 respectively journaled by the spaced bearing assemblies 68 associated therewith, an end thrust portion 84 being connected to the portion 82 for cooperation with the end thrust bearing assembly 42 within the bearing housing 38. The other end of the main rotor shaft 52, referred to by reference numeral 86, is keyed to the drive gear 56 and extends through the pressure seal assembly 58. An extended section is spliced onto the shaft portion 86 for accommodating an enlarged gear housing assembly 34 and pressure seal assembly 58 as compared to pump assemblies heretofore utilized, so that the main drive shaft 52 may be coupled to a prime mover in any suitable fashion as by a key element 90, for example (see FIGURE 9).

Although leakage flow from opposite sides of the pump rotor chamber 20 had been received by packings within the tubular extensions 64 in pump constructions heretofore utilized, the arrangement of the present invention replaces such packings by leakage controlling means including a rigid bushing assembly generally referred to by reference numeral 92 which extends from the bearing assembly 68 into the tubular extension 64. As more clearly seen from FIGURES 3 and 7, the bushing assembly 92 which is preferably made of cast iron, includes a flanged portion 94 received within the bearing support portion 66 of the pump frame sections 16 and 18, and is in abutting relation to the spaced bearing assemblies 68. The other axial end portions 96 of the bushing assemblies are of a reduced diameter and project into the annular space formerly occupied by stuffing material. Shouldered against the tubular extension 64 within which the portions 96 of the bushing assemblies are received, are the intermediate portions 98 of the bushing assemblies which are disposed between the axial spacing between the tubular extensions 64 and the bearing support portions 66. Disposed in concentric relation about the intermediate portions 98 of the bushing assemblies, are leakage sealing sleeves 100 preferably made of steel and welded to the tubular extensions 64 and the bearing support portions 66 so as to positively prevent leakage into the annular cavity in the housing. Leakage flow from the rotor pump chamber will therefore be confined to flow along the rotor shafts through the spaced bearing assemblies 68 axially spaced on opposite sides of the rotor chamber for journaling the rotor shafts.

The bearing assemblies 68 abutting against the flange portions 94 of the bushing assemblies, are maintained in assembled relation on the shaft portions 70 and 82 of the rotor shafts by means of thrust bearing plates 102 which are also disposed in abutting relation to the end thrust bearing assemblies 40 and 42 within the lubricating housings 36 and 38. The lubricating housings are therefore bolted to the end bearing support portions 66 of the frame section 16 by means of a plurality of bolt assemblies 104. The lubricant whether it be the material being pumped or some other fluid within the lubricating housings 36 and 38 is maintained under a relatively high pressure by means of an insulated lubricating line 106 connected to the discharge 24 of the pump assembly, the line 106 being connected by a T-coupling 108 and elbows 110 to each of the lubricating housings 36 and 38 as more clearly seen in FIGURES 8 and 1. Thus, leakage flow along the rotor shafts that may occur during pump operation will be directed away from those axial ends of the rotor shafts received within the end thrust bearing assemblies 40 and 42.

The drive ends of the rotor shafts as hereinbefore indicated, project into the gear casing assembly 34. The gear casing assembly 34 is provided with a steam jacket chamber 112 formed between an outer wall 114 and an inner wall 116 both of which are welded to a cover plate member 118 which is secured by bolt assemblies 120 to a housing back plate member 122 which in turn is secured to the housing frame section 18. Bearing retainer members 124 are disposed against the back plate member 122 in abutting relation to the bearing assembly 68 so as to maintain said bearing assemblies in proper position on the portions 72 and 80 of the rotor shaft in abutting relation to the flanged portions 94 of the bushing assemblies 92. The steam supplied to the heating chamber 26 of the pump housing will also be supplied to the steam chamber 112 through the steam inlet conduit 32 so as to maintain the material within the gear chamber 126 in a fluid state. Leakage flow of material from the rotor chamber will be received within the gear housing chamber 126 in view of the pressurization of the lubricating chambers within the housings 36 and 38. In cooperation therewith pressure reducing means is provided so that the pressure within the gear housing chamber 126 is maintained lower than that in the rotor chamber during pump operation. The pressure reducing means includes fluid connection between the gear housing chamber 126 and the suction inlet of the pump assembly. As more clearly seen from FIGURES 1, 2 and 8, a gear case discharge line 128 to which the gear case pressure discharge gauge 130 is connected provides fluid communication to the suction inlet by connection to an insulated balancing line 132 which in turn is connected by T-couplings and conduits 134 to opposite sides of the suction inlet to the pump rotor chamber. Also to assist in reducing the pressure within the gear casing chamber 126, the usual vacuum control valves associated with the suction inlet to the pump assembly, are replaced by a vacuum by-pass line 136 as more clearly seen in FIGURE 1, arranged to equalize the suction or vacuum pressure at the inlet so that all the vacuum created at this point of the pump will help in reducing the pressure in the gear case chamber. The suction inlet 22 is also provided with a pressure gauge 138 while the discharge outlet 24 is provided with a discharge pressure gauge 140 so that operating conditions may be checked. Also, the gear case assembly 34 is provided with a lubrication drain outlet 142 and a steam outlet 144 as more clearly seen in FIGURE 3.

From the foregoing, it will be apparent that any leakage of the material being pumped will be confined to the gear case. A single high pressure seal assembly 58 therefore replaces all of the individual seal assemblies heretofore used in connection with pump constructions. Referring, therefore, to FIGURES 5 and 6 in particular, it will be observed that the seal assembly 58 includes a gland member 146 disposed in coaxial relation to the shaft portion 86 by means of a plurality of alignment studs 148 threadedly connected to an end wall member 150 welded to annular sleeve portions 152 and 154 respectively welded to the external wall 114 and internal wall 116 of the steam jacket chamber 112. The gland member 146 is held in axially adjusted spaced relation to the end wall 150 by means of the washer element 156 and adjusting nut 158. An annular brass insert 160 is disposed within the hub portion 162 of the gland member 146 about the external surface of the shaft portion 86, the hub portion 162 abutting against one end of the packing material 164 disposed between the annular wall portion 154 of the steam jacket chamber 112 and the shaft portion 86. The annular wall portion 154 is therefore provided with a radially inwardly projecting flange portion 166 for holding the packing in assembled relation by means of the retainer element 168. A recess is formed within the hub portion 162 of the gland member for receiving therewithin an annular Teflon seal member 170 maintained in concentric alignment by means of a plurality of projecting screw members 172 carried by the hub portion 162 of the gland member 146. The gland member is therefore also provided with an O-ring seat 174 for mounting an O-ring in sealing engagement with the external surface of the seal member 170. A driven seal face plate 176 having an internally tapered surface seating an O-ring 178 is disposed in wiping engagement with the external surface of the shaft portion 86 and is biased in an axial direction by means of a plurality of spring elements 180 seated within aligned sockets in the driven face plate 176 and a seal face driver plate 182 fixed to the shaft portion 86 for rotation therewith by means of the setscrew 184. Rotation is imparted to the driven seal plate 176 by means of a drive pin 186 fixed to the driver plate 182 and received within the socket 188 within the driven plate 176, the driver plate 182 being provided with an axially extending skirt portion 190 enclosing the drive pin 186 and a portion of the driven plate 176. The foregoing description of the mechanical seal assembly 58 is thus arranged to prevent leakage from the gear case chamber 126.

From the foregoing description, the operation, utility and construction of the pump assembly of the present invention will be apparent. As a result of this construction, leakage adjacent the rotor chamber is eliminated by confining any leakage flow to the steam jacketed gear case chamber provided with the high pressure mechanical seal assembly 58. The end thrust bearing assemblies 40 and 42 on the other hand are pressurized with discharge pressure so that they will receive pressurized lubrication and thereby eliminate congealing of material being pumped. The connection to the suction inlet and equalization of the pressure at that point will also be effective to reduce the pressure within the gear case assembly. As a result of the construction described, leakage has been eliminated and a positive gear displacement pump assembly rendered effective for pumping of viscous material such as oxidized asphalt.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A positive displacement pump assembly for viscous material comprising a heated chamber through which said material is displaced between an inlet and an outlet, displacing rotor means mounted in the chamber for displacement of the material, rotor shaft means connected to the rotor means and axially projecting from opposite sides of said chamber, spaced bearing means located in axially spaced relation from said opposite sides of the chamber for journaling the rotor shaft means, end thrust means connected to one axial end of the rotor shaft means, gear drive means connected to the opposite axial end of the rotor shaft means, gear casing means enclosing said gear drive means, pressure reducing means operatively connected to said gear casing means for maintaining pressure therein lower than pressure developed in the chamber to induce flow of leakage material from the chamber to said opposite axial end of the rotor shaft means, leakage controlling means mounted between said chamber and each of said spaced bearing means for restricting leakage flow along the rotor shaft means from said one axial end thereof to the chamber and from the chamber into said gear casing means, pressurized lubricating means operatively connected to said end thrust means for preventing leakage flow from the chamber to said one axial end and heating means disposed in heat transfer relation to the gear casing means for maintaining the leakage material therein in a fluent state.

2. The combination of claim 1 wherein said pressurized lubricating means includes a pressure conduit connected between the end thrust means and the outlet of the chamber.

3. The combination of claim 2 wherein said pressure reducing means includes a balancing conduit connected to said inlet of the chamber and to the gear casing means.

4. The combination of claim 3, wherein said leakage controlling means comprising a rigid bushing fitted on said rotor shaft means and extending between each of the spaced bearing means and the chamber and a leakage sleeve operatively extending between the bearing means and the chamber in concentric relation to the bushing.

5. The combination of claim 4, including mechanical pressure seal means for preventing leakage from the gear casing means about a projecting portion of the rotor shaft means.

6. The combination of claim 1, wherein said leakage controlling means comprises a rigid bushing fitted on said rotor shaft means and extending between the spaced bearing means and the chamber and a leakage sleeve operatively extending between the bearing means and the chamber in concentric relation to the bushing.

7. The combination of claim 1, including mechanical pressure seal means for preventing leakage from the gear casing means about a projecting portion of the rotor shaft means.

References Cited in the file of this patent

UNITED STATES PATENTS

| 1,105,312 | Sundh | July 28, 1914 |
| 1,309,237 | Bausman | July 8, 1919 |
| 1,459,552 | Rathman | June 19, 1923 |
| 1,590,964 | Street | June 29, 1926 |
| 1,702,046 | Fullerton | Feb. 12, 1929 |
| 2,195,886 | Hawley | Apr. 2, 1940 |
| 2,937,807 | Lorenz | May 24, 1960 |

FOREIGN PATENTS

| 778,367 | France | Dec. 22, 1934 |